Nov. 23, 1926.

C. E. SPANGLER 1,607,784

SAW

Filed March 20, 1925   4 Sheets-Sheet 1

C. E. Spangler
INVENTOR

BY Victor J. Evans
ATTORNEY

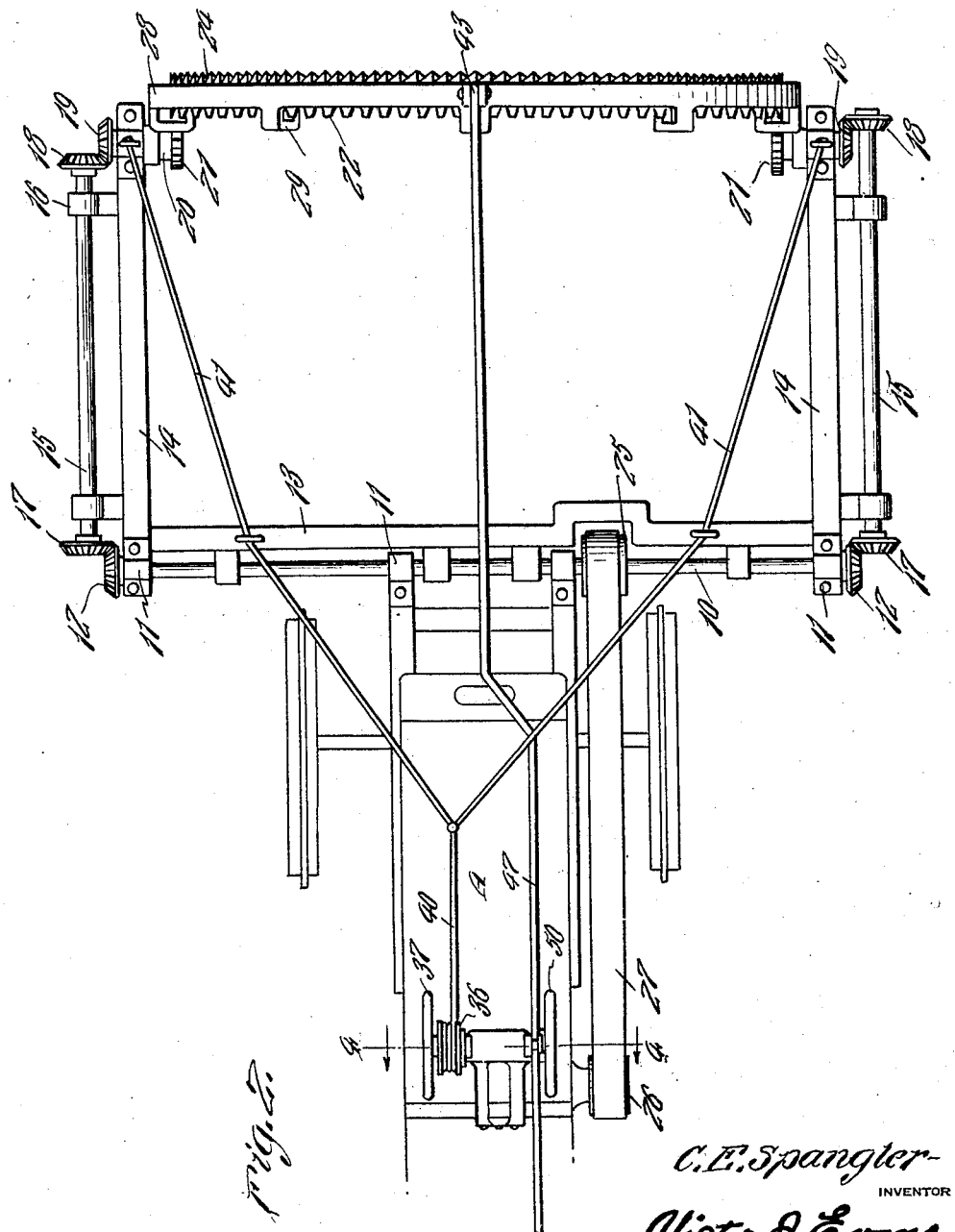

Nov. 23, 1926.  
C. E. SPANGLER  
SAW  
Filed March 20, 1925  
1,607,784  
4 Sheets-Sheet 3
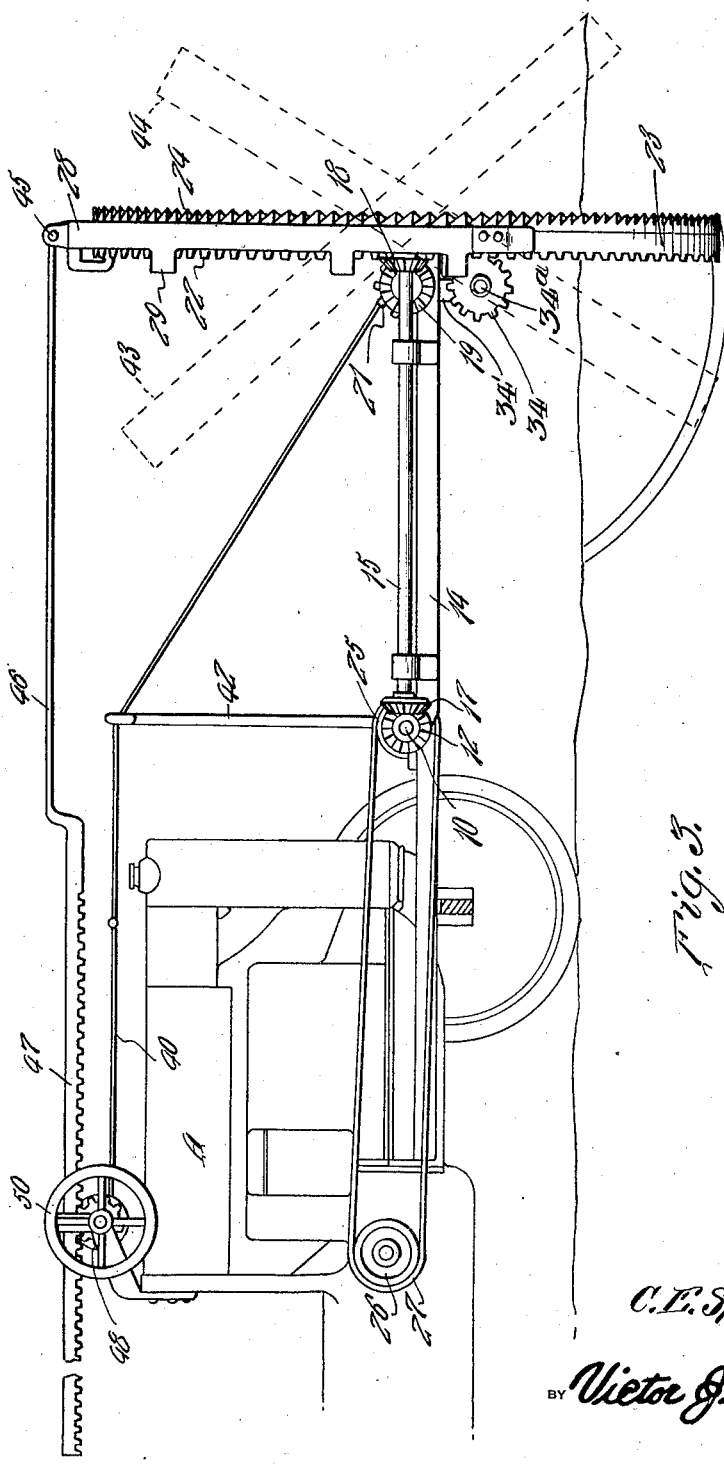

Nov. 23, 1926.
C. E. SPANGLER
1,607,784
SAW
Filed March 20, 1925   4 Sheets-Sheet 4
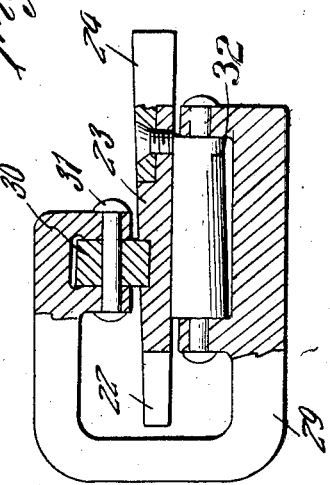
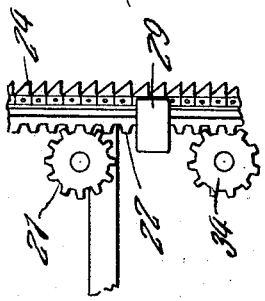
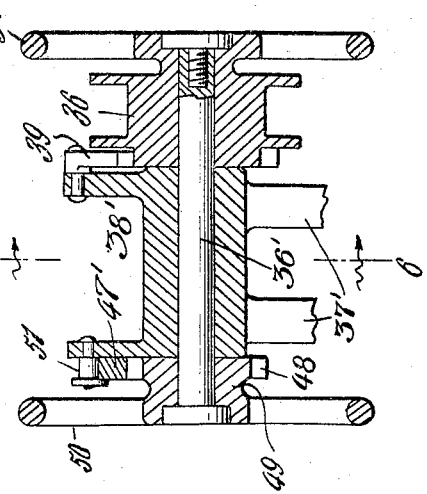
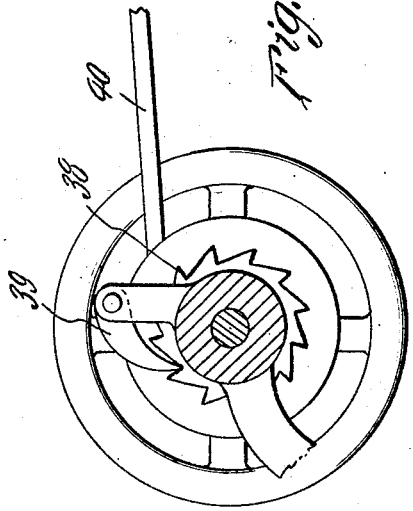
C. E. Spangler,
INVENTOR
BY Victor J. Evans
ATTORNEY Patented Nov. 23, 1926.

1,607,784

UNITED STATES PATENT OFFICE.

CHARLES E. SPANGLER, OF LOCKPORT, ILLINOIS.

SAW.

Application filed March 20, 1925. Serial No. 17,058.

This invention comprehends the provision of means for cutting down stumps and second growth timber, and embodies amongst other features a rotating saw adapted to be mounted upon and operated by a tractor of any well known construction and also capable of being raised and lowered, or swung to occupy any desired angular position with relation to the ground, depending upon the work to be performed.

In carrying out the invention, I contemplate the use of a circular rotating saw to be suitably geared to a driven shaft which is operated from a tractor of any suitable construction, the saw being mounted for pivotal movement and associated with means for gradually feeding the saw through the work while the saw is in operation.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 2 is a top plan view.

Figure 3 is a side elevation showing the normal position of the saw by full lines, and different adjusted positions by dotted lines.

Figure 4 is a sectional view taken on line 4—4 of Figure 2.

Figure 5 is an enlarged view partly in section of one of the saw guides.

Figure 6 is a sectional view on line 6—6 of Figure 4.

Figure 7 is a sectional view on line 7—7 of Figure 1.

Figure 1:
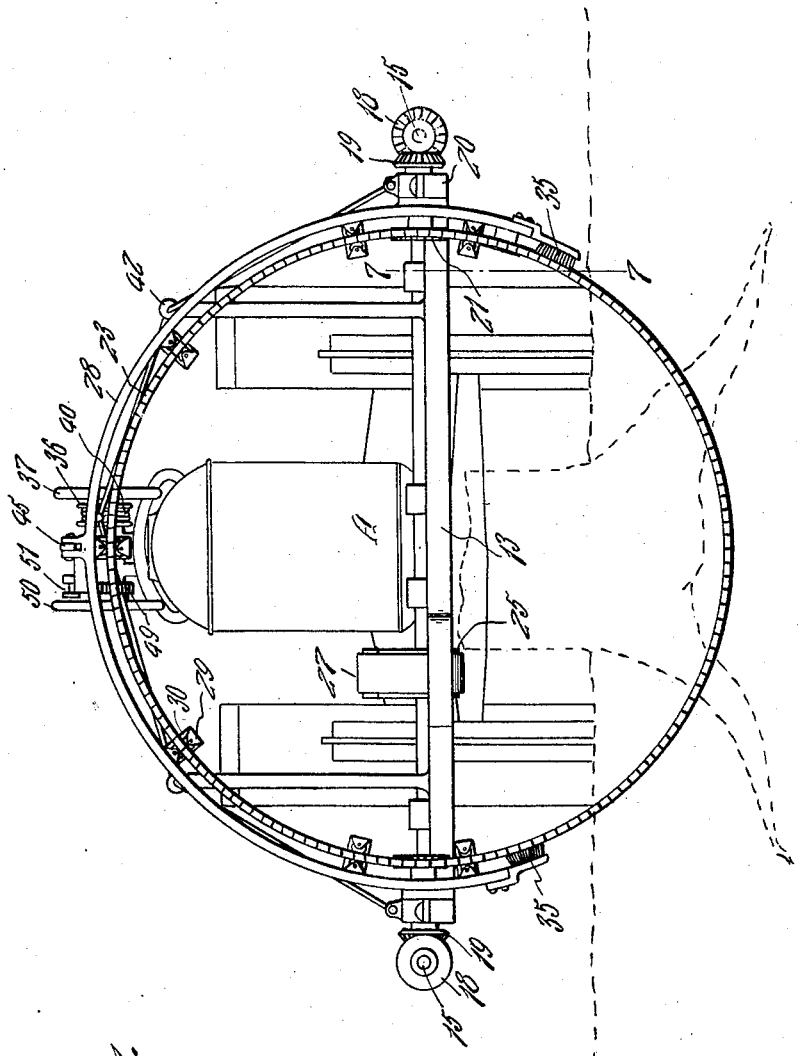
Figure 1 is a front elevation.

Referring to the drawings in detail, A indicates generally a tractor of any desired construction which supports a transversely disposed shaft 10 which is mounted for rotation in suitable bearings 11, the opposed ends supporting bevelled gears 12 as clearly shown in Figure 2. This shaft is associated with a frame including a transversely disposed member 13 arranged adjacent and parallel with the shaft 10, and spaced parallel side members 14. Shafts 15 are journalled in suitable bearings 16 projecting outwardly from the side members 14 and which shafts 15 are arranged at right angles to the shaft 10 to be rotated therefrom. For this purpose, each shaft 15 is provided with a bevelled gear 17 which meshes with the adjacent bevelled gear 12 of the shaft 10. The other end of each shaft 15 is provided with a bevelled gear 18 which meshes with a similar gear 19 carried by one end of the stub shaft 20, the latter being journalled in side members 14 above referred to. Each stub shaft also supports a small gear 21 which meshes with the gear teeth 22 arranged above the saw indicated generally at 23. The gears 21 on the said stub shafts engage the teeth of the saw at diametrically opposed points, and it is manifest, that when the shafts 15 are operated, the saw is rotated to perform its duty, the teeth of the saw being indicated at 24. The shaft 10 is provided with a belt pulley 25 over which and a similar pulley 26 forming part of the tractor is trained an endless belt 27, so that the saw is operated by the tractor with the frame and saw mounted upon the latter as shown in Figures 1 and 2.

Supported by the stub shafts 20 and partly surrounding the saw is an arcuate shaped frame member 28 which supports a plurality of substantially U-shaped guides 29 with the opposed parallel portions of each guide supporting rollers to engage the outer and inner side of the saw 23. One of these rollers indicated at 30 is comparatively small and operates in a groove 31 formed in the saw band, while the roller 32 is comparatively long to bear against the inner periphery of the saw, so that the latter is properly guided in its movement and also properly supported for use. In addition to the gears 21 which are utilized to rotate the saw in the manner described, I provide an idler 34 as shown in Figure 7, which meshes with the teeth 22 so as to keep the latter free from dirt and other foreign matter. The idler 34 is mounted upon a stub shaft $34^a$ which in turn is supported by a bracket 34' depending from one of the side members 14. The teeth 24 of the saw are kept free from dirt and other foreign matter by means of brushes 35 which are supported by the free ends of the arcuate shaped frame or member 28.

As hereinabove stated, the invention is in the nature of an attachment for the tractor, and is primarily intended for removing stumps and second growth timber from land, and to provide for the efficient use and operation of the invention, I contemplate means whereby the saw may be raised or lowered with relation to the ground, and allowed to enter the ground below the plowing depth to cut a stump or tree at the root. For this purpose, I make use of a drum 36 which is suitably mounted upon the tractor as shown in Figure 2, and adapted to be rotated by means of a hand wheel 37, the drum being provided with a suitable ratchet 38 and pivoted pawl 39 which prevents retrograde movement of the drum as will be readily understood. The drum 36 and hand wheel 37 are mounted upon a shaft 36' which is supported by a bearing 38' connected to the upper ends of the spaced uprights 37' supported by any desired part of the tractor. A cable 40 is adapted to be wound about and unwound from this drum, the cable at its forward end being attached to branches 41 which pass through suitable guides 42 rising from the cross bar 13 of the frame above described. The forward ends of these branches 41 of the cable are suitably attached to the side members 14 of the frame, so that the frame together with the saw can be raised or lowered with relation to the ground by simply winding the cable about the drum or unwinding it therefrom. It might here be stated that the frame including the transverse bar 13 and the parallel bars 14 is as a unit pivoted upon the shaft 10 so that the frame can turn when influenced by the cable in the manner described. In addition to this movement of the saw, the latter is also capable of pivotal movement to occupy the positions shown by dotted lines 44 in Figure 3 and which movement of course is necessary in order to feed the saw through the work. The arcuate shaped frame or member 28 is journalled upon the stub shaft 20, and this frame 28 is provided with a lug 45 at the top thereof, and which lug is connected with a manually operated rod 47 which projects rearwardly in the direction of the driver's seat so that it can be conveniently operated as the occasion requires. This rod 47 has as a part thereof a rack bar 47', the teeth of which mesh with a gear 48 which is supported by the hub 49 of the hand wheel 50 mounted on the same shaft which supports the drum 36. This rack bar 47' passes beneath the roller 51 which holds the rack bar operatively associated with the gear 48. so that when the wheel 50 is rotated in either direction, the saw together with the arcuate shaped member or frame 28 is moved to an angular position with relation to the ground and work. In other words, the saw is rotated from the tractor in the manner above described and as it cuts through the stumps or other objects the rack bar 47 is operated to gradually feed the saw through the work as will be readily understood.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. In a device of the character described, a frame normally positioned in a horizontal plane and mounted for pivotal movement toward and away from the ground, an arcuate shaped member supported by said frame for swinging movement, a circular saw member supported by said arcuate shaped member for rotation, operative means carried by the frame for engaging said saw to impart rotary movement thereto, means connected with said frame for moving the same toward and away from the ground and means connected with the arcuate shaped member whereby to rock the same upon its pivot to position the saw in various angular positions relative to the frame.

2. In a device of the character described, a frame mounted for pivotal movement toward and away from the ground and normally disposed in a horizontal plane, an arcuate shaped member supported by said frame for swinging movement U-shaped guide members carried by said arcuate shaped member, a circular saw movable through the said guide members and adapted to swing with the arcuate shaped member, rollers carried by said U-shaped guides and bearing against opposite faces of the saw blade and operative means carried by the frame and cooperating with the saw whereby to rotate the same through said guide members relative to the frame.

3. In a device of the character described, a frame mounted for swinging movement toward and away from the ground and normally disposed in a horizontal plane, means whereby to move said frame toward and away from the ground, an arcuate shaped member disposed at right angles to the frame and supported thereon for swinging movement relative to the frame, a circular saw member supported by the arcuate shaped member, pinions supported by the frame and having engagement with the saw member to rotate the same relative to the frame, operative means connected with said pinions for imparting movement thereto and means connected with the arcuate shaped member whereby to move said member and the saw to various angular positions relative to the frame.

4. In a device of the character described, a frame mounted for swinging movement toward and away from the ground and normally positioned in a horizontal plane, an arcuate shaped member mounted upon the frame for swinging movement and normally disposed at right angles to the frame, U-shaped guide members carried by the frame, a circular saw having an annular groove in its outer face, said saw being positioned between the parallel portions of said U-shaped guides, rollers carried by the U-shaped members adapted to ride within said grooves, a second series of rollers carried by the guides and bearing against the opposite face of the saw, means whereby to move said frame toward and away from the ground, operative means having connection with the saw to impart rotary movement thereto and means whereby to swing said arcuate shaped member and the saw to various angular positions relative to the frame.

In testimony whereof I affix my signature.

CHAS. E. SPANGLER.